United States Patent
Frank et al.

(10) Patent No.: US 7,103,226 B1
(45) Date of Patent: Sep. 5, 2006

(54) VIDEO PROCESSOR WITH COMPOSITE GRAPHICS AND VIDEO PICTURE ELEMENTS

(75) Inventors: Michael Frank, Newtown; Gary Root, Harleysville; Richard J. Selvaggi, Doylestown, all of PA (US)

(73) Assignee: ATI Technologies, Inc., Markham (CA)

( * ) Notice: Subject to any disclaimer, the term of this patent is extended or adjusted under 35 U.S.C. 154(b) by 0 days.

(21) Appl. No.: 09/046,179

(22) Filed: Mar. 23, 1998

(51) Int. Cl.
*G06K 9/40* (2006.01)

(52) U.S. Cl. .................. 382/254; 382/162; 382/166; 345/153; 345/154; 348/407.1

(58) Field of Classification Search ............. 382/254, 382/162, 166, 167, 300; 348/407, 413; 345/153, 345/154, 155
See application file for complete search history.

(56) References Cited

U.S. PATENT DOCUMENTS 4,794,455 A * 12/1988 Ericsson ............... 348/412
5,790,842 A * 8/1998 Charles et al. ............ 395/559
5,859,651 A * 1/1999 Potu ......................... 382/300

* cited by examiner

*Primary Examiner*—Thomas D. Lee
(74) *Attorney, Agent, or Firm*—Vedder, Price, Kaufman & Kammholz, P.C.

(57) ABSTRACT

A video processor integrates the processing of video and graphics data by restructuring the discrete blocks of luminance and chrominance component data associated with video image data (Y,U,V) into composite pixel values (YUYV), and performing the subsequent processing, in particular motion compensation, upon this composite data form. The discrete blocks of video image data are queue and processed in parallel to form a composite pixel value associated with each pixel within the image areas represented by the discrete blocks. By forming composite pixel values for reference data and error term data, common processing elements can be optimized and used for both video and graphics image processing. For example, the trilinear interpolator commonly used for 3-D graphics filtering and texturing can be used to form predicted macroblocks for motion compensation, and the specular adder used for graphics lighting effects can be used to process the motion compensation error terms.

28 Claims, 5 Drawing Sheets

VIDEO PROCESSOR WITH COMPOSITE GRAPHICS AND VIDEO PICTURE ELEMENTS

FIELD OF THE INVENTION

This invention relates to the field of video processing, and in particular to the processing of RGB and MPEG image representations.

BACKGROUND OF THE INVENTION

Conventionally, the creation and animation of computer generated graphic images employ the use of special purpose hardware and software. The display of a realistic looking changing scene, such as a scene of walking figures, requires the computation of changing lighting and visibility factors as the figures pass through shadows, or pass in front of and behind each other. The textured surfaces forming the image, such as the figures' clothing, must be rendered in a realistic fashion, and these renderings are dependent upon the changing lighting and visibility factors. Algorithms and techniques have been developed to optimize the creation and processing of graphics images, and special purpose hardware and software devices and systems have been developed to efficiently and effectively utilize these algorithms and techniques.

The algorithms and techniques used for graphics image processing are, in general, picture-element (pixel) based. A composite pixel value, such as an RGB composite, is associated with each pixel forming the image. A pixel's composite value includes sufficient information to display the pixel without regard to other parameters, or other pixel values. An RGB composite, for example, contains an indication of the amount of Red, Green, and Blue color components that are to be contained in the displayed pixel. This is sufficient information to display each particular pixel. In some systems, a fourth parameter, A, is included in an ARGB composite, where A contains an indication of the translucency of the colors forming the pixel.

Video image processing, for example, the display of a motion picture recorded on a video disc, is, in general, block based, using discrete blocks of data to represent each component's values (such as the luminance component, or the chrominance component) within a frame or portion of a frame. Each frame of an image is encoded in a format optimized for transmission or storage, such as an MPEG (Motion Picture Expert Group) stream. These frames can be further split into fields by separating even and odd lines. For further discussion the term frame includes either full frames or fields. Sequential scenes in a motion picture are efficiently encoded by encoding a reference frame, and then merely encoding the differences from one frame to the next. Additional efficiencies are gained by encoding the differences from one frame to the next as a set of movements of macroblocks of image information in the reference frame. That is, each frame is partitioned into macroblocks, and each subsequent frame is encoded as a relocation of an arbitrary group of pixels that are the size of the macroblock, with interpolation to allow for relocation at a sub-pixel resolution. The relocated macroblock is termed a predicted macroblock. The change of a macroblock's location from the reference frame to the subsequent frame is termed a motion vector, because the change is typically caused by the motion of an object in the changing scenes. Further efficiencies can be provided by encoding a reference frame and a future, or predictor, frame, and encoding intermediate frames as movements of macroblocks from either the reference or the predictor frames, or a combination (average) of these two frames, or from within the same frame. For ease of understanding, the terms reference frame and reference macroblock are used herein to mean any frame or macroblock to which motion vectors are applied to create other frames or macroblocks. In addition to the motion vectors, each subsequent frame includes a set of error terms that describe the difference between the predicted macroblock and the actual image being encoded. A number of transformations are applied to the error terms to minimize the time and bandwidth required to communicate the error terms. These transformations are well known to one of ordinary skill in the art and are not presented herein. The encoding of MPEG frames via these transformation is not necessarily loss free, and therefore the received error terms are an approximation. The reconstruction of a frame image by applying motion vectors and error terms to reference frames is termed motion compensation. It is estimated that motion compensation accounts for more than 30% of the processing of MPEG streams.

Video images are typically encoded using luminance (Y) information (the brightness), and chrominance (U,V) information (the redness and blueness). The human visual system is more sensitive to a change of brightness than to a change of color. Therefore, the encoding of video images includes the encoding of luminosity changes at a higher rate or higher resolution than chrominance changes. The luminance information and chrominance information are each encoded separately and distinctly, to allow for this difference in rate or resolution, and also to optimize the motion vector and error terms encoding, because the luminance of a scene may change without a corresponding change in color, and vice versa. The three components Y, U, and V are treated as separate image planes and encoded separately. To account for the different spatial resolution of the pixel components, each macroblock encoding contains a different number of samples for each component as defined by the video standard being used. Each of these separate image planes is partitioned into macroblocks. The MPEG stream contains macroblock encodings of each of the three separate components Y, U, and V, rather than a composite of the Y, U, and V components forming each pixel or macroblock. For the group of components Y, U, and V, there is one set of motion vectors describing a common source of prediction.

Increasingly, the same video processing system is being called upon to perform both video and graphics processing. Computers of today are expected to be able to display motion pictures; and televisions of tomorrow will be expected to provide animated graphic imaging. Because the encoding of video images utilizes discrete blocks of luminance and chrominance component data, and the encoding of graphic images utilizes pixel based composite values, systems that support both video and graphics image processing conventionally employ separate processing techniques and devices for each. The need for separate processing also incurs additional secondary requirements for memory and interface devices coupled to the separate processing devices. As the demands for image processing increase, and the functionality expected of a video processing system increases, each of these separate processing techniques and devices can be expected to become increasingly more complex and increasingly more expensive.

Therefore, a need exists for integrating the processing of both video and graphics data, and in particular the integration of video motion compensation and graphics processing, to optimize the use of available resources, and to minimize the cost of video processing systems.

DETAILED DESCRIPTION OF THE INVENTION

The invention integrates the processing of video and graphics data by restructuring the discrete blocks of component data associated with video image data into composite pixel values, and performing the subsequent processing, in particular motion compensation, upon this composite data form. A significant portion of the processing of video frame-based data is devoted to image reconstruction. Motion compensation, deriving each frame based on reference frames, motion vectors, and error terms, constitutes a significant portion of the processing required for video images, such as those encoded in an MPEG stream. By structuring the reconstruction process to have parallels to the conventional graphics pixel-based process, common functional blocks can be employed for each, and the use of common ancillary devices, such as memories, can be optimized.

For ease of understanding, the invention will be presented utilizing MPEG-YUV and RGB as the format of component block data and composite pixel data respectively. However, it will be recognized that any suitable video image and pixel image data formats may be used. MPEG utilizes luminance-chrominance encoding of images, although other encoding schemes, such as RGB and CMYK (cyan-magenta-yellow-black) would be evident to one of ordinary skill in the art. Similarly, MPEG utilizes motion vectors and error terms for encoding one frame with reference to another; other referential encoding schemes, such as differential encoding, would also be evident to one of ordinary skill in the art, and are within the spirit and scope of this invention. As discussed above, the error terms may not accurately reflect the differences between the encoded frame and the original image; and, in the extreme, the error terms may be absent. The term motion compensation data is used herein to encompass the parameters used to construct an image, or portion of an image, from another image or portion of an image, regardless of the particular encoding scheme.

Figure 1:
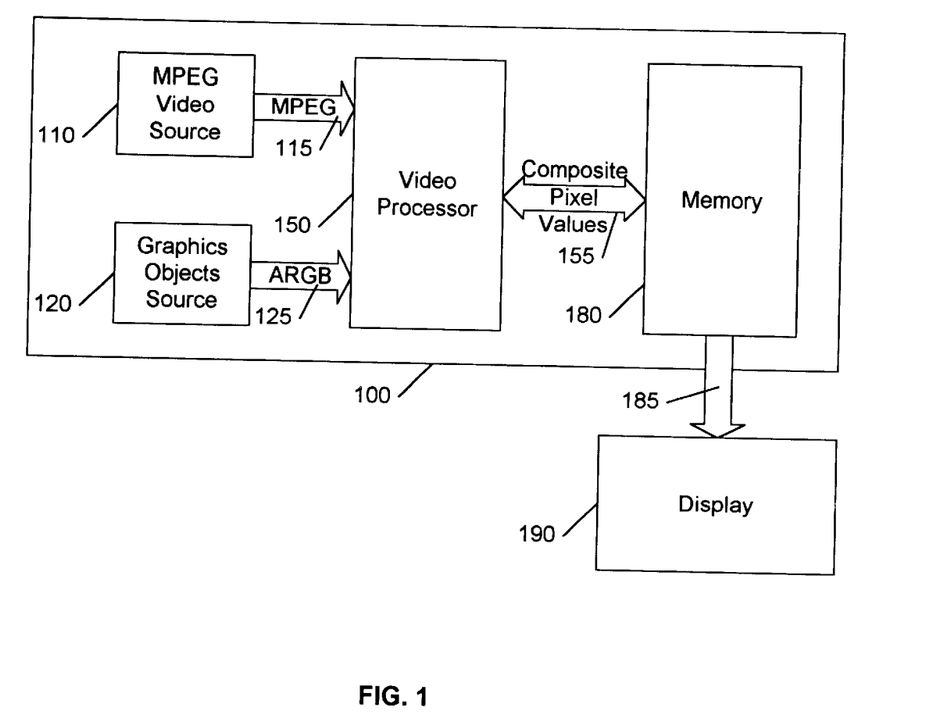
FIG. 1 illustrates a block diagram of an embodiment of a video processing system in accordance with this invention.

FIG. 1 shows a block diagram of a video processing system 100 that includes an MPEG video source 110, a graphics object source 120, a video processor 150, and a memory 180. The video processor 150 processes either MPEG streams 115 or ARGB composite pixel values 125 to produce composite pixel values 155 that can be stored in the memory 180. The video processor 150 can also access stored composite pixel values 155 from the memory 180 for subsequent processing. A display 190 accesses the composite pixel values 155 in the memory 180 via access 185, to render the resultant image for viewing.

The MPEG video source 110 provides the MPEG stream 115. The MPEG video source 110 can be, for example, a video CD player, a digital camera, an internet browser, an interface to a digital cable service or satellite service, an MPEG data file in memory, or any other source of MPEG encoded data. For the purposes of this disclosure, the MPEG stream 115 includes the MPEG frames after the inverse of the conventional transformations of the error terms are applied. That is, the MPEG stream 115 contains luminance (Y) and chrominance (U,V) data blocks, motion vectors, and error terms in a demodulated and decoded form.

The graphics objects source 120 is any source of composite pixel data, that is, data associated with each pixel that is sufficient to render the pixel for display. Conventionally, the graphics objects source 120 is a computer program that generates composite pixel data as RGB (red-green-blue) or ARGB (alpha-red-green-blue) values, where alpha is an opacity factor. The term graphics objects source is used herein to distinguish this source from the source of blocks of component data, because graphics objects are conventionally pixel-based.

Regardless of the source of image data, either the MPEG video source 110 or the graphics objects source 120, the video processor 150 creates composite pixel values, that is, values that are associated with each pixel that are sufficient to render each pixel for display. By providing the same form of data output, that is, composite pixel values, similar memory and interface requirements exist, and common interface and memory techniques and devices can be employed, as shown by the singular memory block 180 in FIG. 1.

Figure 2:
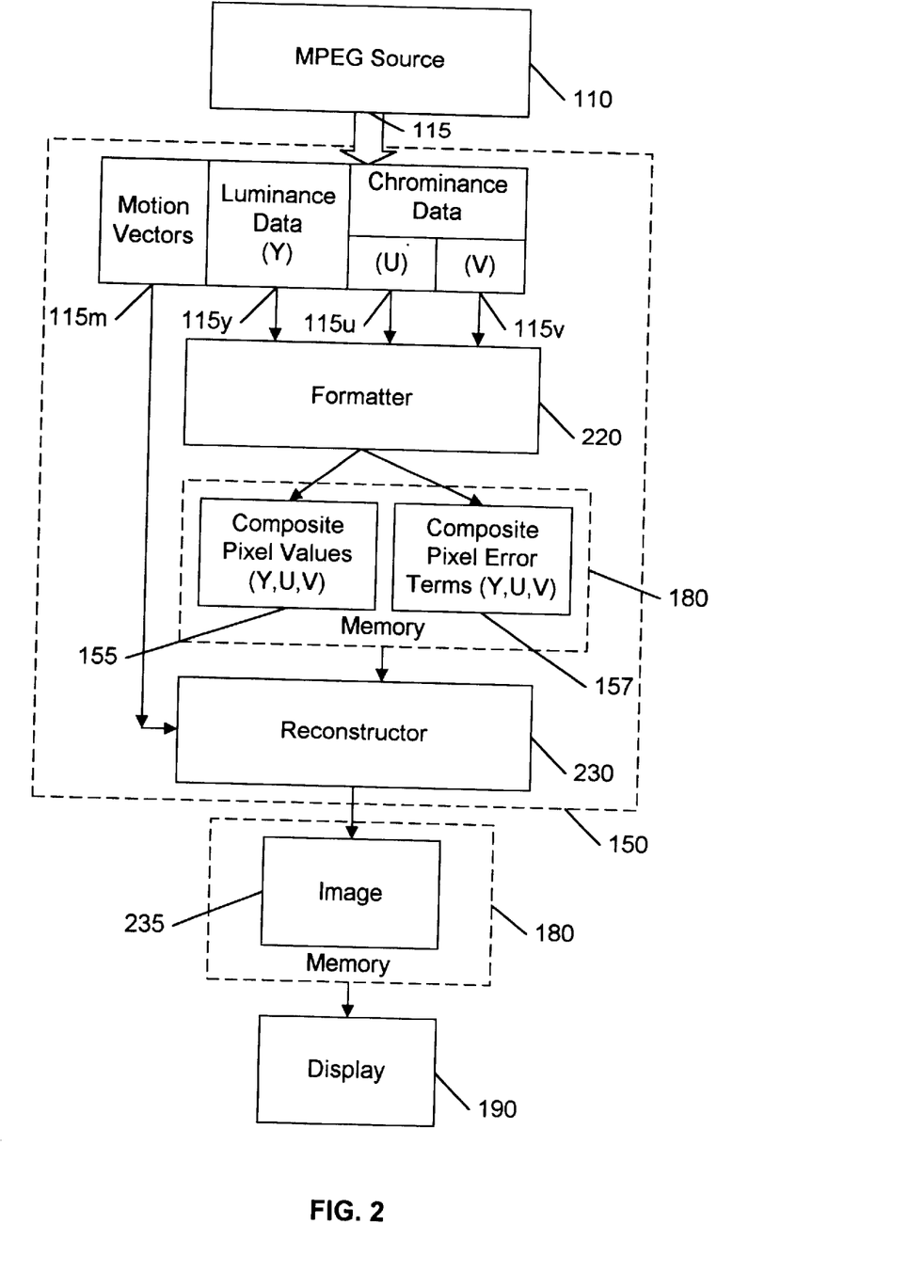
FIG. 2 illustrates a block diagram of an embodiment of a video processor for processing MPEG streams in accordance with this invention.

FIG. 2 shows a block diagram of an embodiment of a portion of a video processor 150 for processing discrete blocks of luminance data (Y) 115$y$ and chrominance data (U) 115$u$ and (V) 115$v$. These blocks of data 115$y$, 115$u$, and 115$v$ are associated with an image frame or a portion of an image, such as a macroblock, and would be contained in a conventional MPEG stream 115. In accordance with this invention, the blocks of luminance data (Y) 115$y$ and chrominance data (U,V) 115$u$ 115$v$ are processed in parallel by a formatter 220 to produce composite pixel values 155, that is, values associated with each picture element sufficient to render that picture element for display. In the preferred embodiment, the composite pixel values 155 will contain the luminance and chrominance data (YUV) associated with each pixel, preferably in a 4:2:2 format, as will be discussed with regard to FIG. 3. The reconstructor 230 processes the composite pixel values 155, which may have been temporarily stored in memory 180, to produce a reconstructed image 235, for example a complete frame of reconstructed composite pixel values. In accordance with this invention, the motion vectors 115$m$ are applied to the composite pixel values 155, rather than to the discrete blocks of luminance data (Y) 115$y$ and chrominance data (U,V) 115$u$, 115$v$. The MPEG error terms, if any, are also encoded as discrete luminance data (Y) 115$y$ and chrominance data (U,V) 115$u$, 115$v$, and are similarly converted to composite pixel error terms 157, for processing by the reconstructor. The reconstructed image 235 is stored to memory 180 for subsequent processing or display. By formatting the discrete luminance (Y) data 115$y$ and chrominance (U,V) data 115$u$, 115$v$ in parallel to produce composite pixel values 155, techniques and devices utilized for graphics pixel-based processing can be used to form the reconstructor 230. Additionally, conventional graphics processing techniques, such as filtering, scaling, etc. can be applied to subsequently process the video images that are stored as composite pixel values.

Figure 3:
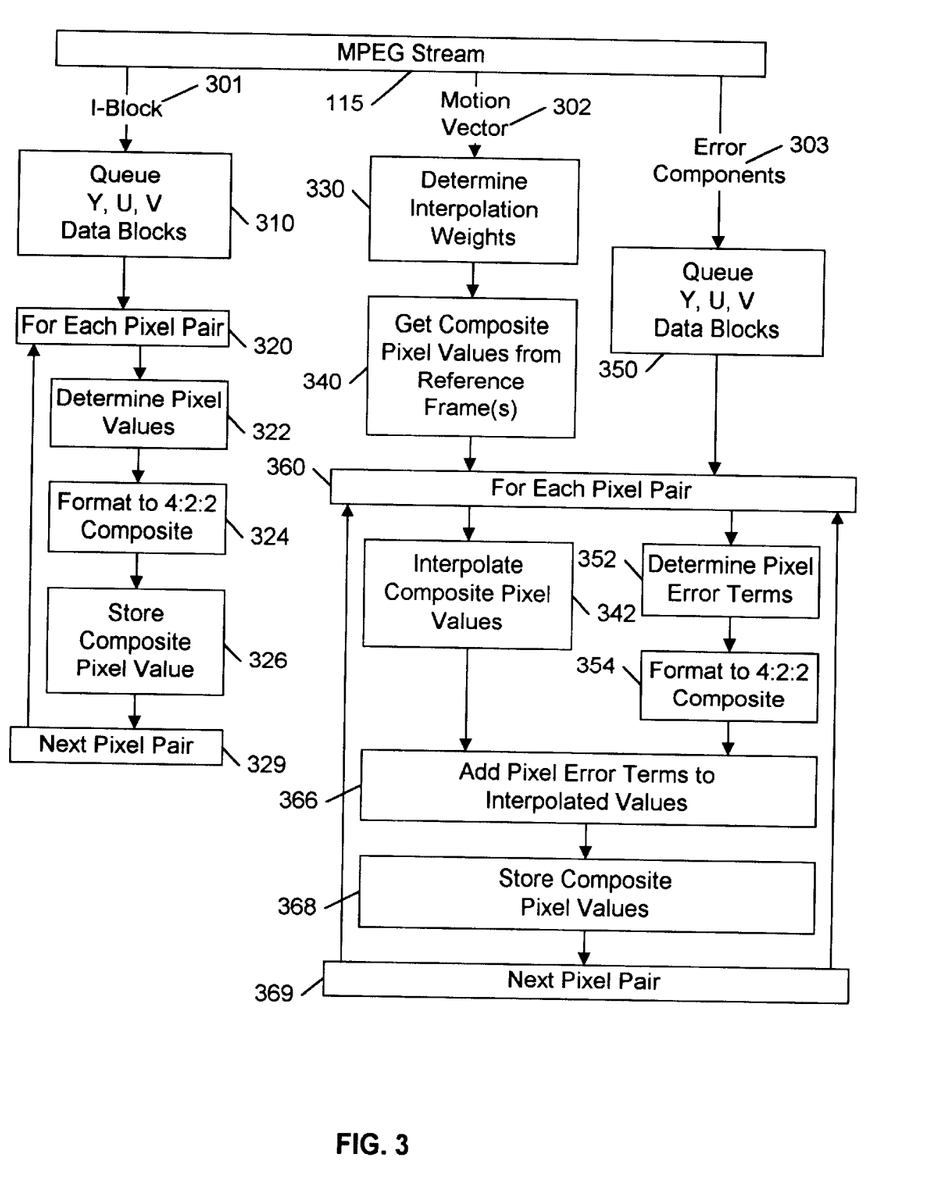
FIG. 3 illustrates a flowchart for processing MPEG streams in accordance with this invention.

FIG. 3 shows a flowchart for processing an MPEG encoded stream in accordance with one embodiment of this invention, for example the video processor 150 of FIG. 2. The encoding of an MPEG frame includes reference frames and motion compensation data, formulated as I-blocks 301, motion vectors 302, and error components 303. The I-blocks 301 contain the luminance (Y) and chrominance (U,V) information required to render the section of the image corresponding to the particular I-block. The motion vectors 302 do not contain explicit image information, but rather contain an offset with respect to previously processed frames or portions of frames. The previously processed frame is termed a reference frame, and the frame being described by the motion vectors is termed the target frame. For ease of understanding, the terms reference data, reference macroblock, etc. are used herein to refer to the entities being referred to by the motion compensation data, and target data, target macroblock, etc. refer to entities that are to be produced by applying the motion compensation data to the referenced entities. The error components 303 represent a difference factor between the reference macroblock and the target macroblock, and may be null.

A reference frame, in general, will be formed as a series of I-blocks 301. As each I-block 301 is received, the discrete luminance (Y) and chrominance (U,V) data blocks are queued, at step 310 of FIG. 3, corresponding to 115y, 115u, and 115v in FIG. 2. These blocks are queued in order to allow the formatter 220 to process the discrete luminance (Y) and chrominance (U,V) data in parallel, to form composite pixel value 155 corresponding to each picture element. In the preferred embodiment the individual pixels are processed in pairs, as shown by the index of the loops 320–329 and 360–369 in FIG. 3. From the queued luminance (Y) and chrominance (U,V) data, the formatter 220 determines the luminance and chrominance value of each pixel, at 322, and formats the luminance and chrominance value of the pair of pixels into a 4:2:2 format, at 324. The 4:2:2 format is a standardized nomenclature used to signify that for every 4 luminance (Y) samples, there are 2 each chrominance (U,V) samples. In the preferred embodiment, the composite value for the pixel pair is stored as a packed YUYV value, wherein the first Y is the luminance value of the first pixel, the second Y is the luminance value of the second pixel, and the U and V values are the chrominance values (redness and blueness) associated with both the first and second pixel of the pair. The packed YUYV composite pixel values for each pixel pair in the I-block 301 is stored to memory 180, at 326.

Subsequent frames, in general, will be formed as motion vectors 302 and error components 303 relative to macroblocks of one or more reference frames. If a sufficiently similar macroblock cannot be found in a reference frame, an I-block is used to encode the target macroblock directly. The reconstructor 230 reconstructs those portions of the frame not encoded as I-blocks by applying the motion vectors 302 and error components 303, if any, to the appropriate reference macroblocks in reference frames. This reconstruction, as discussed above, is conventionally termed motion compensation. FIG. 3 shows an example of motion compensation that may be used by the reconstructor 230 to process the motion vectors 302 and error components 303.

The motion vectors 302, in general, are at a sub-pixel resolution. That is, for example, a motion vector may offset a reference macroblock by a fractional quantity, conveying such information as "move macroblock Q by 3½ pixels to the right, and 32½ down." In such cases, the target macroblock will not be a direct reproduction of the reference macroblock, but rather an interpolated reproduction, formed by averaging the reference pixel values surrounding each offset target pixels. At 330, the reconstructor 230 determines the appropriate interpolation factors, or weights, to effect this fractional offset. At 340, the reconstructor 230 identifies the pixel values required to perform the interpolation. The required pixel values will not necessarily be contained within one macroblock, because the fractional offset may require the use of pixel values from adjacent macroblocks. Also, the motion vector may reference a combination of macroblocks located in different reference frames.

Synchronous to the processing of the motion vectors 302, the reconstructor 230 processes the error components 303 associated with each motion vector 302. The conventional MPEG error components 303 are contained in discrete luminance (Y) and chrominance (U,V) data blocks. The luminance (Y) and chrominance (U,V) data blocks are queued, at 350, so that the reconstructor 230 can process the luminance (Y) and chrominance (U,V) data in parallel to determine a composite error term associated with each pixel, discussed below.

In the loop 360–369, the synchronous processing of the motion vectors 302 and error components 303 are combined. For each pixel pair, the reconstructor 230 interpolates the reference pixel values, at 342, based on the interpolation weights associated with the motion vectors 302. Synchronous with this interpolation, the reconstructor 230 determines the error terms associated with the pixel pair, at 352, and formats the error terms into a composite 4:2:2 format, at 354. In the preferred embodiment, the composite error terms will be a packed YUYV error value, consistent in form with the composite pixel values. At 366, the reconstructor 230 adds the composite error terms to the results of the interpolation of the reference pixel values to produce a motion compensated composite pixel value. At 368, the video processor 150 stores each of the motion compensated composite pixel values in memory 180 to form a reconstructed image 235 for subsequent processing or display.

Figure 4:
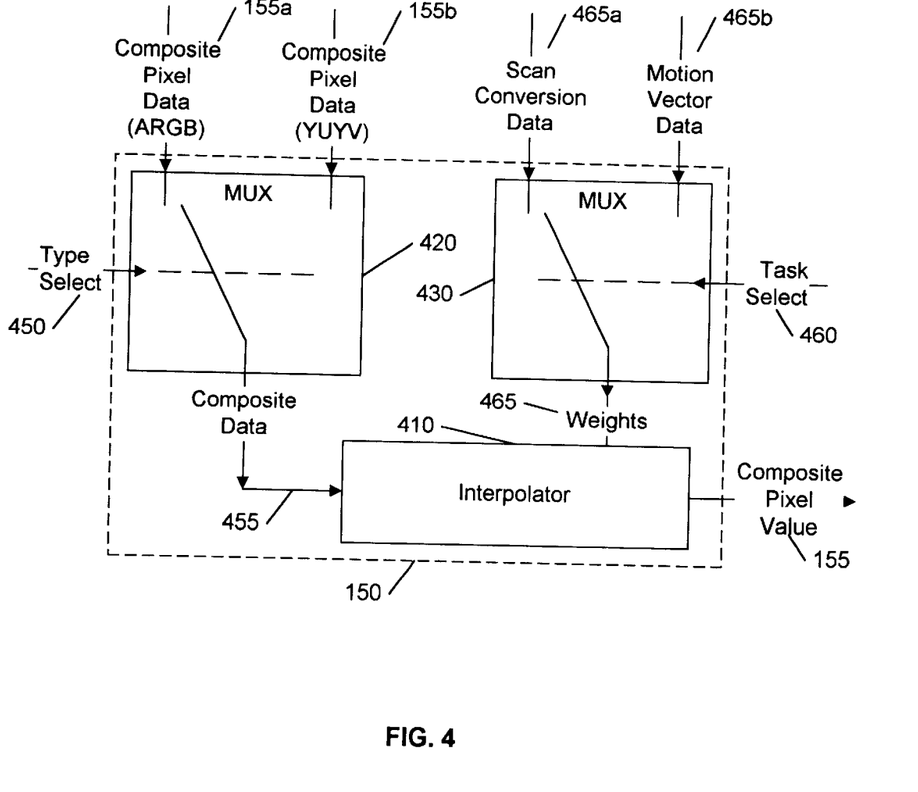
FIG. 4 illustrates a block diagram of an embodiment of a video processor for processing luminance-chrominance (YUYV) and red-green-blue (ARGB) composite pixel values in accordance with this invention.

The restructuring of video (MPEG) discrete data blocks into composite pixel values, as discussed above, provides a structure that is well suited for hardware optimization, and in particular a structure that is well suited for compatibility and commonality with existing graphics (ARGB) image processing. FIG. 4 shows a block diagram of an embodiment of a portion of a video processor 150 for processing composite pixel values 155 that includes composite alpha-red-green-blue (ARGB) pixel values 155a and composite luminance-chrominance (YUYV) pixel values 155b. A conventional graphics image processor includes an interpolator 410 that is used for data averaging, filtering, texturing, and other data conversion tasks, commonly termed scan conversion. As is common in the art, the interpolator 410 performs linear, bilinear, or trilinear interpolation. Bilinear interpolation averages, for example the pixels of a 2×2 block of pixels to produce a single value, corresponding to a pixel value at a selected location within the 2×2 block. Trilinear interpolation is commonly used in 3-D graphics systems. The interpolator 410 is structured to process composite pixel values that include four component values (alpha, red, green, and blue components). The restructuring of blocks of component data into composite pixel values allows for the use of this same interpolator 410 for image reconstruction, as well as other image processing tasks.

In the preferred embodiment, the luminance-chrominance pixel values are structured as packed YUYV values, so as to be similar in structure to the ARGB values used for graphics image processing. That is, the preferred composite luminance-chrominance pixel values also include four component values (luminance-1, chrominance-red, luminance-2, chrominance-blue), wherein luminance-1 is the luminance of the first pixel of a pixel pair, and luminance-2 is the luminance of the second pixel in the pixel pair, as discussed above. The video processor 150 of FIG. 4 includes a multiplexer 420 that selects between composite pixel values of two data types: alpha-red-green-blue (ARGB) 155a, and luminance-chrominance (YUYV) 155b. The selection is based upon a type select signal 450; the selected composite pixel value forms the composite data input 455 to the interpolator 410. A multiplexer 430 selects the interpolation weights 465 to be applied, depending upon a task select signal 460. FIG. 4 shows an example of scan conversion data 465a providing one source of interpolation weights. Such conversion (filtering, texturing, etc.) can be applied to composite pixel values of either type 155a or 155b to produce converted composite pixel values 155 of either type. Motion vector data 465b provides the other source of interpolation weights, for performing motion compensation on the YUYV type composite pixel values 155b. By selecting the luminance-chrominance (YUYV) type, and the motion compensation task, the interpolator 410 is able to perform the interpolation function shown by step 342 in the flowchart of FIG. 3. That is, by providing a common composite pixel value structure, the interpolator 410 can be used for scan conversions of graphic and video images, as well as for motion compensation of video images.

Figure 5:
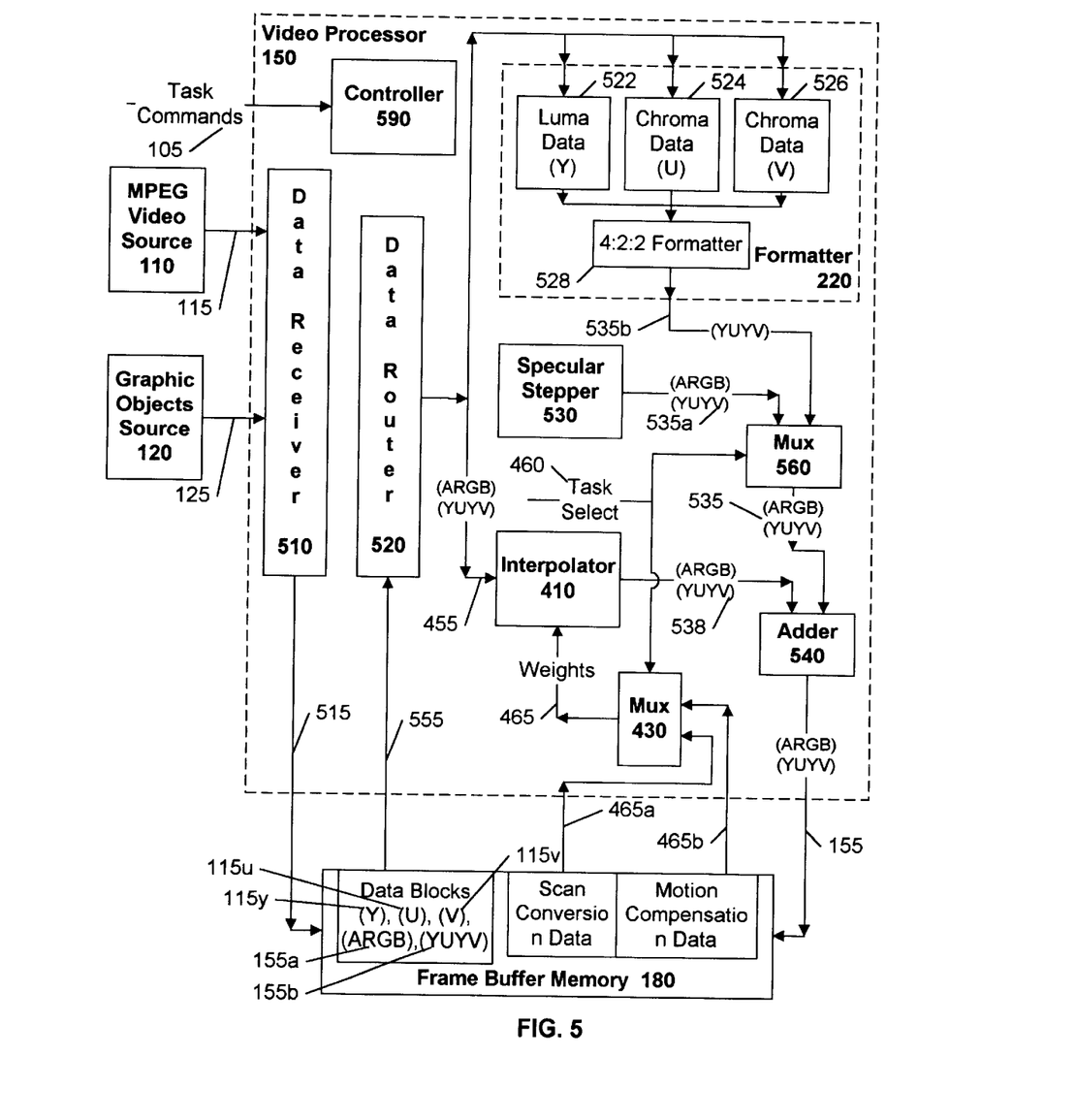
FIG. 5 illustrates a block diagram of an embodiment of a video processor for processing luminance-chrominance block data (Y, U, V), luminance-chrominance composite pixel values (YUYV), and red-green-blue composite pixel values (RGB) in accordance with this invention

FIG. 5 illustrates a block diagram of the preferred embodiment of a video processor 150 in accordance with this invention, using the particular example of MPEG and ARGB processing. In the preferred embodiment, the frame buffer memory, common in graphic processing systems, is used as the memory 180. A controller 590 controls the operation of each of the blocks of the video processor 150, performing the tasks discussed below. A data receiver 510 receives the graphics ARGB data 125 or MPEG video data 115 from the graphics and video sources 120 and 110 respectively. In the preferred embodiment the received data 515 is placed in the memory 180 for subsequent processing by the video processor 150, although it may be processed directly from the sources 110 and 120. The block diagram of FIG. 5 is best understood by tracing example operations of the video processor 150.

For graphics processing, the controller 590 processes task commands 105 and formulates the scan conversion data required to perform the tasks. The task commands 105 are generated by a user or application program to direct the processing of the video or graphics data. Consider, for example, the processing of a graphic object to add realism, such as texture and lighting effects. Conventionally, such processing will be applied to computer generated ARGB composite pixel values 155a, although video derived YUYV composite pixel values 155b could be similarly processed in accordance with this invention. Under the control of the controller 590, the data router 520 extracts the appropriate composite pixel values 155a or 155b from the memory 180; the controller 590 and data router 520, in effect, perform the data selection function of the multiplexer 420 in FIG. 4 to produce composite pixel values 455. The composite pixel values 155 include, for example, the composite pixel values corresponding to the graphic object being converted, as well as the composite pixel values corresponding to the texture being applied. The scan conversion data 465a are the interpolation weights that determine the combinations of these composite pixel values to produce the visual effect of a textured surface. A specular stepper 530 is conventionally used to add lighting effects to a graphics object. Depending upon the data type being processed, as controlled by the controller 590, the specular stepper 530 provides either ARGB or YUYV values 535a. Under the control of the controller 590, multiplexer 430 is set to select the scan conversion data 465a as the interpolation weights 465, and the specular stepper values 535a as the increment values 535. The interpolator 410 interpolates the composite pixel values 455, based on the interpolation weights 465, and an adder 540 adds the specular increment values 535 to the results of this interpolation 538 to form composite pixel values 155 for each of the pixels within the graphics object being processed. The composite pixel values 155 are stored in memory 180 for subsequent processing or display.

For image processing, and in particular for motion compensation, the controller 590 controls the operation of the video processor 150 in dependence upon the received data 515 as discussed below.

Consider first the receipt of a reference frame that includes I-blocks 301 (not shown) of discrete blocks of luminance (Y) data 115y and chrominance (U,V) data 115u, 115v. The data router 520 routes the discrete blocks of luminance (Y) data 115y and chrominance (U,V) data 115u, 115v into queues 522, 524, and 526 of the formatter 220. Note that these queues may be contained in memory 180, and may have been preformed by the receiver 510. The luminance (Y) data 115y and chrominance (U,V) data 115u, 115v is converted to composite pixel values 535b by the 4:2:2 formatter 528. As discussed above, in the preferred embodiment, the luminance-chrominance composite pixel values are packed YUYV values that are structured similar to the graphics ARGB values. In the case of I-blocks, the motion vector data 465b is set to 0 by the controller 590. The controller 590 sets the multiplexer 430 to select the motion vector data 465b as the interpolation weights 465, and sets the multiplexer 560 to select the composite pixel values 535b as the increment values 535. Because the interpolation weights 465 are zero, the output 538 of the interpolator 410 will be zero, and therefore the output of the adder 540 will be equal to the composite pixel values 535b formed by the formatter 220. These composite pixel values 155 are stored in memory 180, and form the reference composite pixel values used for the reconstruction and motion compensation of subsequent MPEG frames that refer to this reference frame.

Subsequent MPEG frames will include motion vectors 302, and possibly, error components 303 and I-blocks 301. The I-blocks 301 (not shown) are processed as discussed above with respect to reference frames; they are each converted to composite pixel values 155 by the formatter 220 and stored in memory 180. The controller 590 formulates motion compensation data 465b based upon the received motion vectors 302 (not shown). The motion compensation data 465b includes the appropriate interpolation weights to be used for the fractional interpolation of reference macroblocks, as discussed above. The controller 590 also directs the data router 520 to extract the appropriate composite pixel values 155b from the reference frames in memory 180 corresponding to the target macroblock of each of the motion vectors 302. These extracted composite pixel values 155b form the input 455 to the interpolator 410. The controller 590 also directs the data router 520 to place the discrete blocks of luminance (Y) and chrominance (U,V) error components 303 into the corresponding queues 522, 524, and 526 of the formatter 220. The 4:2:2 formatter 528 processes the discrete luminance (Y) 115y and chrominance (U,V) 115u, 115v error components 303 (not shown) into composite pixel error terms 535b, preferably as packed YUYV values. The controller 590 sets the multiplexer 430 to select the motion vector data 465b as the interpolation weights 465, and sets the multiplexer 560 to select the composite pixel error terms 535b as the increment values 535. The interpolator 410 interpolates the reference composite pixel values 455 based on the interpolation weights 465, and the adder 540 adds the increment values 535 to the interpolation results 538 to produce the target composite pixel values 155 corresponding to the pixels of the target macroblock. The target composite pixel values 155 represent the motion compensated reconstruction of the target frame, and are stored in memory 180 for subsequent processing or display.

Thus, as presented above, it is seen that the same components, in particular the interpolator 410, the adder 540, and the memory 180, can be used to effect both graphic and video image processing and conversion, as well as video image motion compensation. By restructuring video blocks of component data into composite pixel data that is similar in structure to graphic composite pixel data, the resources used to process video and graphics data can be optimized. Additionally, the research, development, and manufacturing resources devoted to the development of graphic image processing devices and circuits can be directly applied to video image processing as well.

The foregoing merely illustrates the principles of the invention. The components and structure presented above can be implemented in hardware, software, or a combination of both. For example, the controller 590 and the formatter 220 may be implemented as software or firmware that is executed by an embedded processor, while the computationally intensive interpolator 410 and adder 540 are implemented as hardware devices. Additional elements may also be present in the block diagrams of the example embodiments. For example, as is commonly known in the art, a color space conversion element that converts YUV to RGB may be utilized between the interpolator 410 and the adder 450 for modifying video surfaces that are used as texture in a graphics rendering process. Similarly, although the invention has been presented as a means for optimizing the use of hardware devices, the entire video processor 150 may be implemented in software, the optimization gained being the reuse of software, thereby reducing the development efforts required to produce software for graphics and video processing. It will thus be appreciated that those skilled in the art will be able to devise various arrangements which, although not explicitly described or shown herein, embody the principles of the invention and are thus within its spirit and scope.

We claim:

1. A video processing system comprising:
  a first source that provides graphics data that includes first composite pixel values,
  a second source that provides image data that includes discrete blocks of component data and includes motion compensation data,
  a video processor, operably coupled to the first source and the second source, that
    processes the graphics data based on the first composite pixel values,
    processes the discrete blocks of component data to produce second composite pixel values, and
    processes the image data based on the second composite pixel values
  wherein the video processor includes a reconstructor that creates target composite pixel values based on at least one of the second composite pixel values produced from discrete blocks of component data and the motion compensation data; and
  memory operably coupled to the video processor, to store the first and second composite pixel values to facilitate subsequent processing and display and that stores the target composite pixel values to facilitate subsequent processing and display.

2. The video processing system of claim 1, wherein
  the reconstructor includes an interpolator, operably coupled to the memory, that processes the at least one of the plurality of second composite pixel values to produce the target composite pixel values based on a first set of interpolation weights, the first set of interpolation weights being based on the motion compensation data.

3. The video processing system of claim 2, wherein
  the interpolator also processes stored composite pixel values to produce converted composite pixel values based on a second set of interpolation weights, the second set of interpolation weights being based on scan conversion data.

4. The video processing system of claim 1, wherein
  the motion compensation data includes discrete blocks of error component data,
  the video processor converts the discrete blocks of error component data into composite pixel error terms, and
  the reconstructor creates the target composite pixel values based also on the composite pixel error terms.

5. The video processing system of claim 4, wherein
  the reconstructor includes:
  an interpolator, operably coupled to the memory, that processes the second composite pixel values to produce first interpolated values based on a first set of interpolation weights, the first set of interpolation weights being based on the motion compensation data, and,
  an adder, operably coupled to the interpolator, that adds the composite pixel error terms to the first interpolated values to create the target composite pixel values.

6. The video processing system of claim 5, wherein
  the interpolator also processes stored composite pixel values to produce second interpolated values based on a second set of interpolation weights, the second set of interpolation weights being based on scan conversion data, and
  the adder adds increment values to the second interpolated values to create converted composite pixel values.

7. The video processing system of claim 6, wherein the increment values are determined by a specular stepper, and the scan conversion data is texturing data.

8. The video processing system of claim 1, wherein the first composite pixel values are composite alpha-red-green-blue pixel values and the second composite pixel values are composite luminance-chrominance pixel values.

9. The video processing system of claim 8, wherein the composite luminance-chrominance pixel values are packed YUYV values.

10. The video processing system of claim 1, wherein the image data is an MPEG stream.

11. The video processing system of claim 1, further including a display, operably coupled to the memory, that displays an image corresponding to stored composite pixel values.

12. The video processing system of claim 1, wherein the video processor is an integrated circuit chip.

13. The video processing system of claim 1, wherein the discrete blocks of component data include blocks of luminance data and blocks of chrominance data.

14. A video processor for processing image data that includes discrete blocks of component data and motion compensation data, comprising:
- a formatter that receives the motion compensation data that converts the discrete blocks of component data into a plurality of reference composite pixel values, and
- a reconstructor, operably coupled to the formatter, that creates a plurality of target composite pixel values based on at least one of the plurality of reference composite pixel values and the motion compensation data, wherein the reconstructor includes an interpolator that processes the at least one of the plurality of reference composite pixel values to produce the plurality of target composite pixel values based on a first set of interpolation weights, the first set of interpolation weights being based on the motion compensation data.

15. The video processor of claim 14, wherein
the interpolator also processes a plurality of stored composite pixel values to produce converted composite pixel values based on a second set of interpolation weights, the second set of interpolation weights being based on scan conversion data.

16. The video processor of claim 15, wherein the plurality of stored composite pixel values includes composite alpha-red-green-blue values.

17. The video processor of claim 15, wherein the plurality of stored composite pixel values includes composite luminance-chrominance values.

18. The video processor of claim 14, wherein
the motion compensation data includes discrete blocks of error component data,
the formatter includes a converter to convert the discrete blocks of error component data into composite pixel error terms, and
the reconstructor creates the plurality of target composite pixel values based also on the composite pixel error terms.

19. The video processor of claim 18, wherein
the reconstructor includes:
- an interpolator that processes the at least one of the plurality of reference composite pixel values to produce first interpolated values based on a first set of interpolation weights, the first set of interpolation weights being based on the motion compensation data, and
- an adder, operably coupled to the interpolator and the formatter, that adds the composite pixel error terms to the first interpolated values to create the plurality of target composite pixel values.

20. The video processor of claim 19, wherein
the interpolator also processes a plurality of stored composite pixel values to produce converted composite pixel values based on a second set of interpolation weights, the second set of interpolation weights being based on scan conversion data.

21. The video processor of claim 20, wherein
the adder adds increment values to the converted composite pixel values.

22. The video processor of claim 21, wherein the increment values are determined by a specular stepper and the scan conversion data is texturing data.

23. The video processor of claim 14, wherein the pluralities of reference and target composite pixel values are composite luminance-chrominance pixel values.

24. The video processor of claim 23, wherein the composite luminance-chrominance pixel values are packed YUYV values.

25. The video processor of claim 14, wherein the image data is an MWEG stream.

26. A method for reconstructing an image, comprising the steps of:
- receiving image data that includes discrete blocks of component data and motion compensation data,
- formatting the discrete blocks of component data into a plurality of reference composite pixel values, and
- reconstructing the image based on at least one of the plurality of reference composite pixel values and the motion compensation data.

27. The method of claim 26, wherein
the step of reconstructing the image includes interpolating the at least one of the plurality of reference composite pixel values based on a set of interpolation weights, the set of interpolation weights being based on the motion compensation data.

28. The method of claim 26, wherein
the motion compensation data includes discrete blocks of error component data, and
the method further includes the step of formatting the discrete blocks of error component data into composite pixel error terms, and
the step of reconstructing the image is based also on the composite pixel error terms.

* * * * *